(12) United States Patent
Tseng et al.

(10) Patent No.: US 7,126,728 B2
(45) Date of Patent: Oct. 24, 2006

(54) LINEAR GUIDING MECHANISM

(76) Inventors: Jen-Shou Tseng, No. 18, Wen-Shen St., Chunan Chen, Miao-Li Hsien (TW); Hsiu-O Hsu, No. 5, 417 Lane, Nan-Ta Rd., Hsinchu (TW)

( * ) Notice: Subject to any disclaimer, the term of this patent is extended or adjusted under 35 U.S.C. 154(b) by 515 days.

(21) Appl. No.: 10/063,054

(22) Filed: Mar. 15, 2002

(65) Prior Publication Data

US 2003/0174418 A1 Sep. 18, 2003

(51) Int. Cl.
*H04N 1/04* (2006.01)

(52) U.S. Cl. ........................ 358/497; 358/474; 358/471

(58) Field of Classification Search ................ 358/497, 358/474, 494, 471, 482, 483, 487, 505, 506, 358/512–514; 382/312, 318, 319; 250/234–236; 399/211; 359/210–212
See application file for complete search history.

(56) References Cited

U.S. PATENT DOCUMENTS

| | | | | |
|---|---|---|---|---|
| 5,900,951 A | * | 5/1999 | Tsai | 358/497 |
| 5,999,277 A | * | 12/1999 | Tsai | 358/498 |
| 6,005,685 A | * | 12/1999 | Tsai | 358/497 |
| 6,771,399 B1 | * | 8/2004 | Batten | 358/497 |
| 6,888,651 B1 | * | 5/2005 | Lee | 358/497 |

* cited by examiner

*Primary Examiner*—Cheukfan Lee
(74) *Attorney, Agent, or Firm*—Berkeley Law & Technology Group

(57) ABSTRACT

A linear guiding mechanism for a platform type optical scanner. A V-shaped track is installed inside a casing and positioned parallel to the travel path of a carrier chassis containing a system of optical devices. The upper section of the V-shaped track has a pair of support surfaces forming an included angle. The V-shaped track supports a positioning wheel or a positioning bump attached to the carrier chassis. The carrier chassis moves along the longitudinal direction of the V-shaped track when driven by a driving system. The V-shaped track may be constructed from a pair of monorails so that the driving belt may move inside the space between the monorails. An additional positioning structure may attach to the interior sidewall of the casing to serve as a retainer for the chassis in an initial position.

17 Claims, 4 Drawing Sheets

LINEAR GUIDING MECHANISM

BACKGROUND OF INVENTION

1. Field of Invention

The present invention relates to a linear guiding mechanism. More particularly, the present invention relates to a linear guiding mechanism for guiding horizontal movement of the carrier chassis of an optical scanner.

2. Description of Related Art

As computing power, network and multi-media technologies continue to improve, the optical scanner has become an indispensable piece of equipment for capturing text or picture images and converting them into a digital image file. Maturity of techniques for fabricating the optical scanner also brings about widespread use alongside a personal computer. At present, the most common type of optical scanner is the platform scanner. In general, a platform scanner includes a transparent flat panel for placing a document or image to be scanned. Through an internal optical system inside the scanner, the analogue image on the document or image is scanned to produce corresponding digital signals. The digital signals are gathered to produce an image file so that the image file may be displayed, identified, edited, stored or transmitted thereafter.

The optical system of a platform scanner comprises a light source, a lens, a reflecting mirror and an optical or optical-electrical sensor such as a charge-coupled device (CCD) sensor all enclosed within an carrier chassis. Since the optical sensor is a one-dimensional device without any movement, movement in a second dimension has to be introduced in order to scan the entire document or picture image. Hence, a conventional platform scanner has a transmission assembly for driving the carrier chassis horizontally in a straight line so that each segment within the document or image is brought under the optical sensor.

To explain the linear driving mechanism of the carrier chassis within a platform scanner, refer to FIGS. 1A and 1B. FIGS. 1A and 1B are the respective front view and top view of the carrier chassis of a conventional platform scanner and associated driving assembly. The carrier chassis 122 of an optical system 120 is installed over a scanner housing 110 (only a portion of the entire structure is shown). To drive both ends of the carrier chassis in the forward direction and back as indicated, the stepper motor 136 of a driving system 130 drives, directly or indirectly by means of a belt wheel 134a, a belt 132 wrapped around the belt wheel 134a and another belt wheel 134b. In the meantime, the clamping structure 124 on the carrier chassis 122 clamps onto a section of the driving belt 132. In addition, an axial sheath 126 on the carrier chassis 122 is slid onto a positioning rod 140. With this arrangement, the carrier chassis 122 can move horizontally forward and backward in a linear direction along the longitudinal direction of the positioning rod 140 when driven by the belt 132.

Due to width requirement of scanning, the carrier chassis 122 has a fixed structural length so that both ends of the carrier chassis 122 may move horizontally in the indicated directions. A conventional platform scanner utilizes the driving system 130 (such as the right side as shown in FIG. 1B) to drive one end of the carrier chassis 122 and the axial sheath 126 around the axial rod 140 to serve as a guide in the motion. In addition, a passively driven wheel 128 is fixed to the bottom section on the other end of the carrier chassis 122 (on the left side as shown in FIG. 1A). Hence, both ends of the carrier chassis 122 may move synchronously and smoothly forward or backward along the axial rod 140 direction on a horizontal plane.

In brief, a conventional platform scanner uses an axial sheath on a carrier chassis and a corresponding axial rod to serve as a linear guiding mechanism so that the carrier chassis is able to move in the axial rod direction when driven by a driving system. Note, however, that most conventional platform scanners are assembled such that the positioning rod must be precisely assembled to the scanner housing. In addition, most positioning rods must be made from metal. Since a metallic rod generally has a higher procurement cost, overall production cost of the platform scanner is increased

SUMMARY OF INVENTION

Accordingly, one object of the present invention is to provide a linear guiding mechanism for a platform scanner capable of driving the carrier chassis of the scanner linearly forward or backward on a horizontal plane when driven by a driving assembly. In addition, the driving assembly occupies a smaller space so that overall size of the platform scanner is reduced. Furthermore, the platform scanner is easier to assemble and uses materials having a lower procurement cost. Ultimately, overall production cost of the platform scanner is greatly reduced.

To achieve these and other advantages and in accordance with the purpose of the invention, as embodied and broadly described herein, the invention provides a linear guiding mechanism for an optical scanner. The optical scanner at least includes a casing, a driving system and an optical system. The casing has a box-like body with a hollow central space. The driving system and the optical system are both installed inside the casing. The driving system includes a driving belt while the optical system further comprises a carrier chassis and a clamping structure. The clamping structure is mounted on the carrier chassis and engaged with a portion of the driving belt. The linear guiding mechanism at least includes a V-shaped track installed inside the casing and a positioning wheel mounted on the carrier chassis. The V-shaped track is positioned in a direction that corresponds to the travel path of the carrier chassis. The upper section of the V-shaped rail has a pair of symmetrical support surfaces running in a direction parallel to the length of the V-shape rail. The support surfaces form an included angle. The rim of the positioning wheel rests on the two support surfaces of the V-shaped track. The axis of the positioning wheel is perpendicular to the longitudinal direction of the V-shaped track. In addition, the V-shaped track may be constructed from two single guide rails each having the aforementioned support surface near the top. A portion of the driving belt is enclosed within the space formed by the two single guide rails.

Aside from using the point rolling format of rolling a positioning wheel over two support surfaces and using the body weight of the carrier chassis to steady the chassis in the vertical Z-axis direction, a positioning bump may substitute for the positioning wheel. The positioning bump is also attached to the carrier chassis. The positioning bump has at least two contact points pressing upon each of the support surfaces. Through point friction format of sliding the contact points on the positioning bump over the support surfaces and the body weight of the carrier chassis, the carrier chassis is fixed along the vertical Z-axis direction.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1A:
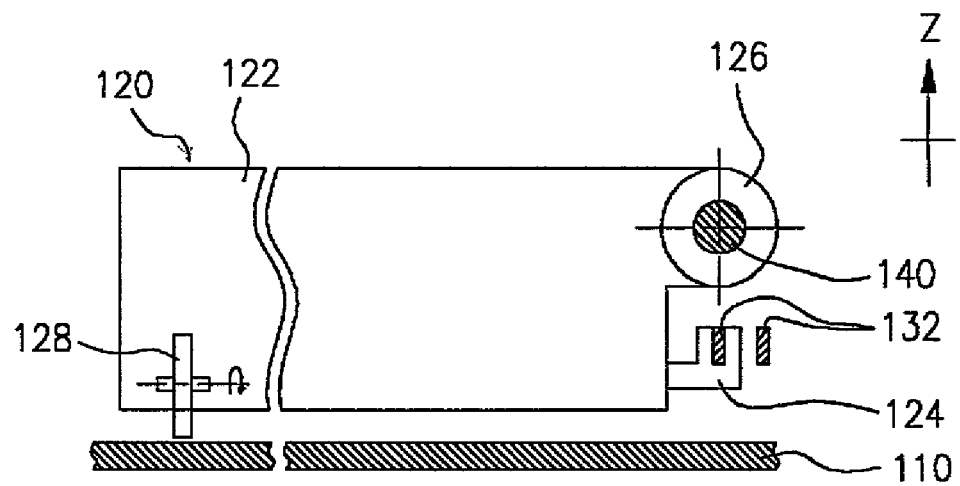
FIGS. 1A and 1B are the respective front view and top view of the carrier chassis of a conventional platform scanner and associated driving assembly.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
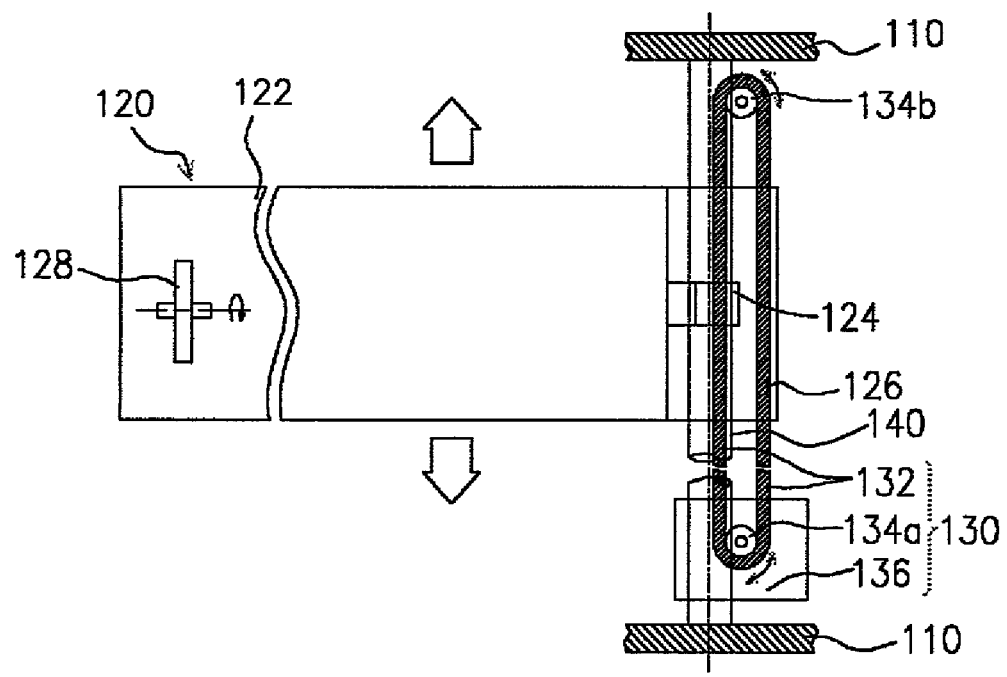
Figure 2A:
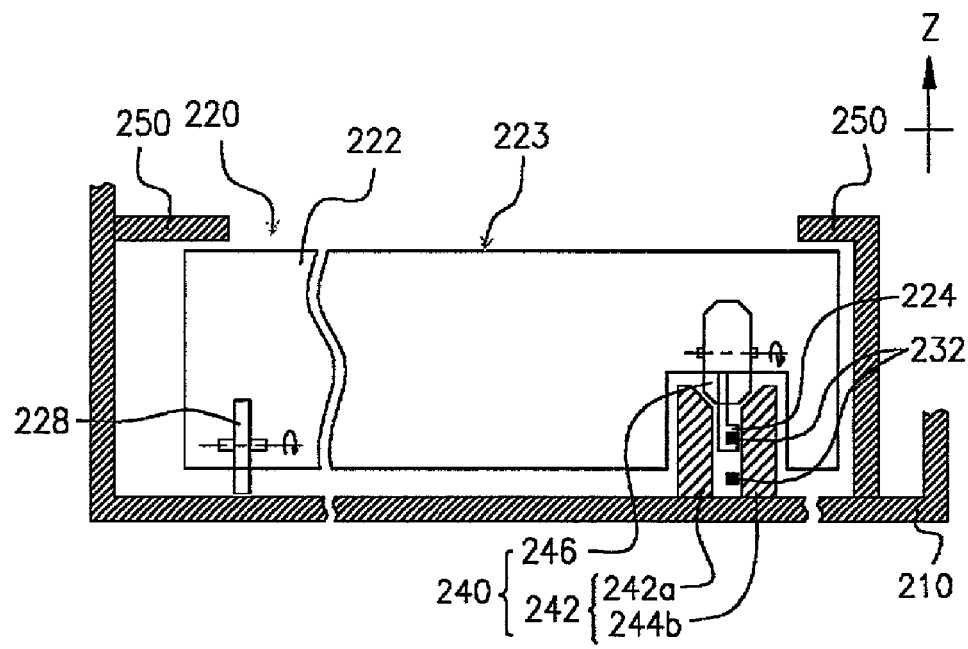
FIGS. 2A and 2B are the respective front view and top view of a linear guiding mechanism used in one type of platform scanner according to one preferred embodiment of this invention.
Figure 2B:
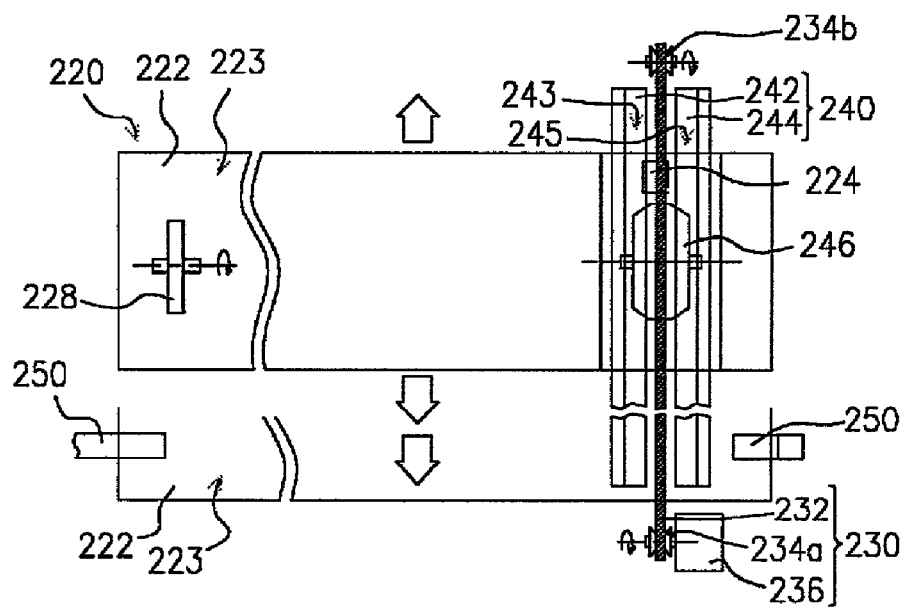

FIGS. 2A and 2B are the respective front view and top view of a linear guiding mechanism used in one type of platform scanner according to one preferred embodiment of this invention. As shown in FIGS. 2A and 2B, an optical system 220 and a carrier chassis 222 are installed inside the central hollow box-like casing 210 (only a portion is shown) of a platform scanner. To ensure forward and backward movement of the carrier chassis 222 in a horizontal plane along the directions indicated by the arrows so that the optical system 220 may conduct a useful scanning operation, the stepper motor 236 of a driving system 230 rotates a driving wheel 234a directly or indirectly through a speed reduction device (not shown). The driving wheel 234a, in turn, pulls a driving belt 232 wrapped around the driving wheel 234a and another passive belt wheel 234b. When the driving belt 232 is driven in linear motion, the carrier chassis 222 is pulled along through a clamping structure 224 attached to the carrier chassis 222 and clamped tightly to a portion of the driving belt 232. To facilitate stable forward and backward motion of the carrier chassis 222 when driven by the driving belt 232, a special linear guiding mechanism 240 is introduced replacing the sheath 126 and guiding rod 140 system as shown in FIGS. 1A and 1B.

Figure 3A:
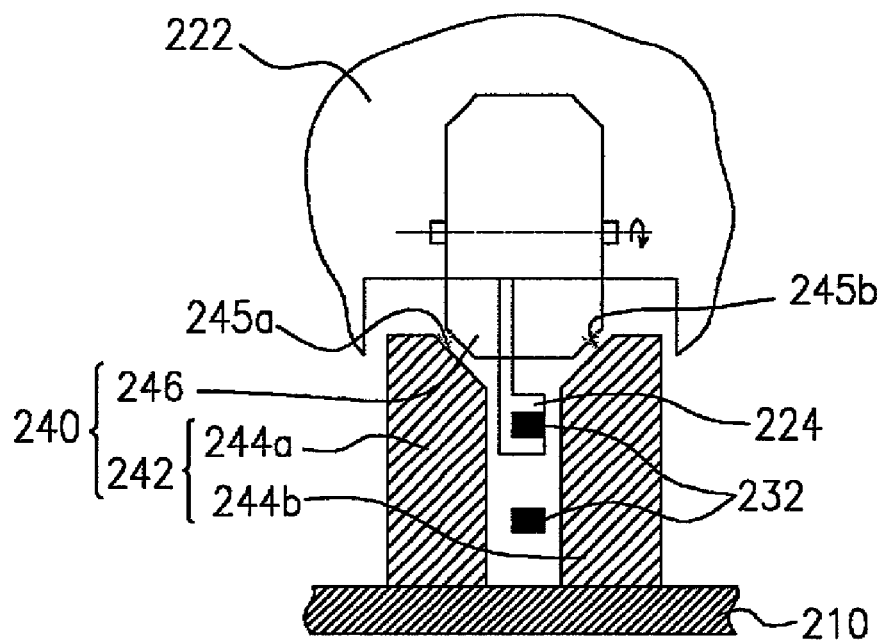
FIG. 3A is a magnified view of the positioning and guiding section of the platform scanner shown in FIG. 2A.

FIG. 3A is a magnified view of the positioning and guiding section of the platform scanner shown in FIG. 2A. The linear guiding mechanism 240 of the carrier chassis 222 includes a V-shaped track 242 and a positioning wheel 246. The V-shaped track 242 is positioned in a direction parallel to the linear traveling path of the carrier chassis 222 and is directly attached to the base of the casing 210 or formed together with the casing 210 in one piece. The upper section of the V-shaped track 242 has a symmetrically laid pair of support surfaces 245a and 245b. Both support surfaces 245a and 245b extend in a parallel direction along the length of the V-shaped track 242. The support surfaces 245a and 245b form a V-shaped included angle. The positioning wheel 246 of the linear guiding mechanism 240 is attached to the carrier chassis 222. Lower side rims of the positioning wheel 246 rest on the support surfaces 245a and 245b of the V-shaped track 242 respectively. In addition, the rotation axis of the positioning wheel 246 is positioned in a direction perpendicular to the longitudinal extension of the support surfaces 245a and 245b.

As shown in FIGS. 2A, 2B and 3A, when the stepper motor 236 in the driving system 230 rotates the driving wheel 234a, the driving belt 232 moves forward in a linear direction. The carrier chassis 222 moves forward linearly in the same direction because the clamping structure 224 of the chassis 222 is clamped onto a section of the driving belt 232. Since the positioning wheel 246 of the chassis 222 rests on the support surfaces 245a and 245b, the positioning wheel 246 rolls along the V-shaped track 242. Due to the included angle between the support surfaces 245a and 245b and the weight of the carrier chassis 222 on the positioning wheel 246, the positioning wheel 246 is forced to roll along a path parallel to the longitudinal direction of the V-shaped track 242. Consequently, the carrier chassis 222 also travels along a linear path parallel to the V-shaped track 242.

Due to scanning width requirement of a platform type scanner, the carrier chassis 222 must have a specified length. To ensure that both ends of the carrier chassis 222 move together synchronously in the directions indicated, the linear guiding mechanism 240 is attached to one end (the right side) of the carrier chassis 222. In the meantime, a passive wheel 228 is attached to the bottom section at the other end of the carrier chassis 222 (the left side). Hence, when the driving belt 232 pulls the carrier chassis 222 along the V-shaped track 242, both ends of the carrier chassis will move forward linearly and synchronously.

To reduce spatial occupation of the driving system 230, the V-shaped track 242 may be composed of two single rails, namely, a first rail 244a and a second rail 244b. The support surface 245a and the support surface 245b are located in the upper section of the first rail 244a and the second rail 244b respectively. The single rails 244a and 244b may be manufactured as an integrative unit attached to the interior sidewall of the casing 210. Furthermore, the driven belt wheel 234a and the passive belt wheel 234b of the driving system 230 may be attached to the respective ends of the V-shaped track 242. A large portion of the driving belt 232 is housed within the space between the single rails 244a and 244b. With this setup, spatial occupation of the driving system 230 and hence overall volume occupation of the platform scanner is reduced.

Figure 4A:
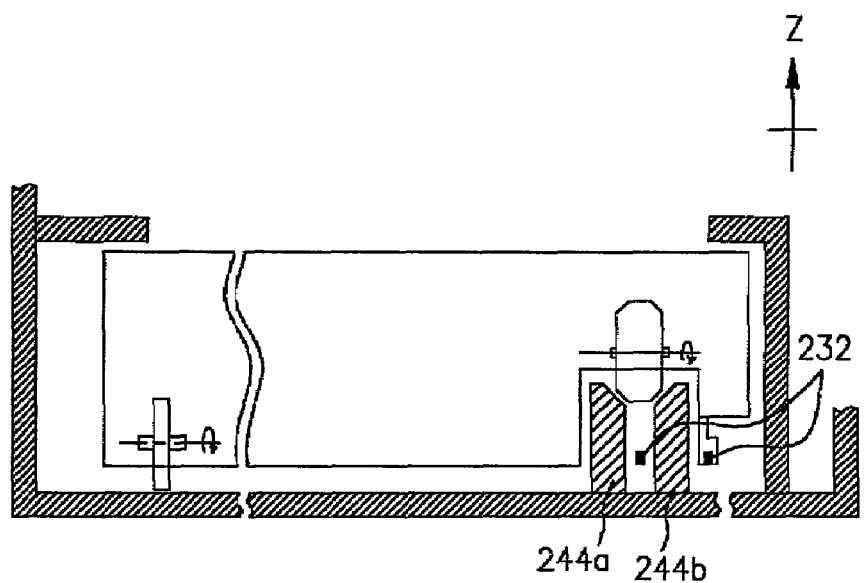
FIGS. 4A and 4B are the respective front view and top view of a linear guiding mechanism used in another type of platform scanner according to one preferred embodiment of this invention.
Figure 4B:
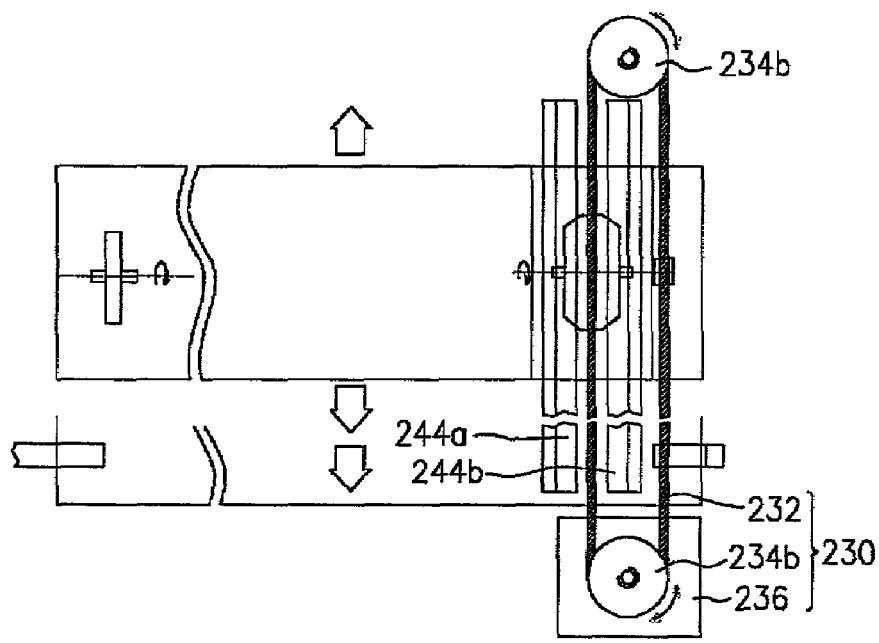

Aside from the layout as shown in FIGS. 2A and 2B, the driving belt 232 of the linear guiding mechanism 240 may also wrap around the driving wheels 234a and 234b in a horizontal plane as shown in FIGS. 4A and 4B. With this setup, only half of the driving belt 232 is enclosed between the single rails 244a and 244b. Likewise, horizontal mounting of the driving belt 232 also saves some space for housing the driving system 230 inside the platform scanner. As shown in FIG. 2A, if the driving belt 232 is designed to run within the space between the single rails 244a and 244b, the clamping structure 224 of the carrier chassis 222 may protrude into the space to grasp a portion of the driving belt 232.

The linear guiding mechanism according to this invention may operate in a "point rolling" manner such that the lower side rims of a positioning wheel are employed to contact the respective support surfaces and moves along the length of a V-shaped track. Meanwhile, the carrier chassis is positioned in the Z-axis direction by the setup. However, the linear guiding mechanism may also operate in a "point friction" manner such as through a positioning bump instead of a positioning wheel. Through the frictional contact between the protruding edge of the bump and the support surfaces along the V-shaped track, the carrier chassis is also pulled along the same direction while fixed in the vertical Z-axis direction.

Figure 3B:
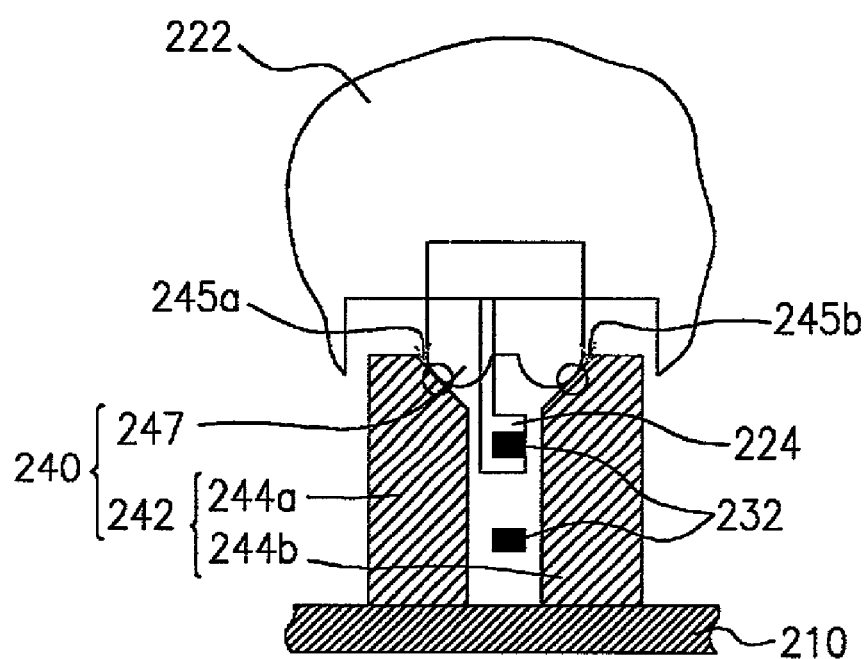
FIG. 3B is a diagram showing the structure after replacing the positioning wheel in FIG. 3A by a positioning bump.

FIG. 3B is a diagram showing the structure after replacing the positioning wheel in FIG. 3A by a positioning bump. As shown in FIG. 3B, a positioning bump 247 replaces the positioning wheel 246 in FIG. 3A. The positioning bump 247 is attached to the carrier chassis 222 or formed together with the carrier chassis 222 as an integrative unit. The protruding edges on the lower section of the positioning bump 247 rest on the support surfaces 245a and 245b respectively. To reduce frictional resistance, contact area between the edges of the positioning bump 247 and the support surfaces 245a and 245b is reduced as much as possible.

As shown in FIGS. 2A and 2B, another positioning structure 250 is also introduced to prevent the detachment of the wheel 246 or positioning bump 247 from the V-shaped track 242 through external vibration. When the carrier chassis 222 is positioned in the initial position (outlined by the dash lines), the positioning structure 250 is close to the upper surface 223 of the carrier chassis 222 or the upper surface of another structure (such as a protruding edge) of the carrier chassis 222. The positioning structure 250 is attached to the interior sidewall of the casing 210 or formed on the casing 210 as an integrative unit.

The linear guiding mechanism according to this invention includes a V-shaped track with two support surfaces at the upper section forming an included angle. The V-shaped track is attached to the interior sidewall of a platform scanner. The guide rail is positioned in a direction corresponding to the direction of movement of the carrier chassis. The two support surfaces of the V-shaped upper section support a positioning wheel or a positioning bump so that the carrier chassis may move along the length of the V-shaped track when driven by a driving belt.

The V-shaped track is constructed from two single rails with a support surface at the upper section. The driving belt may move within the space between the two single rails so that spatial occupation of the driving assembly is reduced. Furthermore, the driving belt may be positioned vertically mostly within the space between the two rails or positioned horizontally with half of the driving belt outside the rails.

An additional positioning structure is also attached to the interior sidewall of the casing close to the initial position of the carrier chassis to prevent the detachment of the positioning wheel or bump from the V-shaped groove due to vibration and thus dislodging the carrier chassis from the casing.

In conclusion, the linear guiding mechanism according to this invention is ideal for a platform type optical scanner. When the linear guiding mechanism is driven by a driving system, an optical system attached to the carrier chassis is able to move forward and backward linearly along a predefined direction. In addition, most of the driving belt is hidden within the two single rails so that spatial occupation of the driving system is reduced. Furthermore, since the V-shaped track, the single rails or the positioning structures and the casing are formed together as an integrative unit, steps for the assembling the platform scanner are greatly simplified. Material cost is also reduced because a metallic positioning guide rod is no longer used.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A linear guiding mechanism for an optical scanner, the optical scanner comprising:
   a casing having a hollow center;
   a driving system installed within the casing, wherein the driving system at least includes a driving belt; and
   an optical system within the casing, wherein the optical system at least includes a carrier chassis and a clamping structure, the clamping structure is attached to the carrier chassis, and clamped onto a portion of the driving belt;
   the linear guiding mechanism comprising:
   a V-shaped track positioned inside the casing in the same direction as the travel path of the carrier chassis, wherein the upper section of the V-shaped track includes a pair of support surfaces, the support surfaces extend in a direction parallel to the longitudinal direction of the V-shaped track, and the support surfaces form an included angle; and
   a positioning wheel attached to the carrier chassis, wherein the positioning wheel is supported by the support surfaces on the V-shaped track, and the axis of the positioning wheel is perpendicular to the longitudinal direction of the V-shaped track.

2. The linear guiding mechanism of claim 1, wherein the V-shaped track and the casing are formed together as an integrative unit.

3. The linear guiding mechanism of claim 1, wherein the V-shaped track is fabricated using two monorails with each monorail having a support surface at its upper section.

4. The linear guiding mechanism of claim 3, wherein at least a portion of the driving belt is enclosed within the space between the two monorails.

5. The linear guiding mechanism of claim 3, wherein the clamping structure protrudes into the space between the monorails.

6. The linear guiding mechanism of claim 3, wherein the monorails are attached to the interior sidewall of the casing to form an integrative unit.

7. The linear guiding mechanism of claim 1, wherein the optical scanner further includes a positioning structure attached to the interior sidewall of the casing to serve as a retainer for the carrier chassis.

8. The linear guiding mechanism of claim 1, wherein the positioning structure is attached to the interior sidewall of the casing to form an integrative unit.

9. A linear guiding mechanism for an optical scanner, the optical scanner comprising of:
   a casing having a central hollow space;
   a driving system within the casing, wherein the driving system at least includes a driving belt; and
   an optical system within the casing, wherein the optical system at least includes a carrier chassis and a clamping structure, wherein the clamping structure is attached to the carrier chassis and clamped onto a portion of the driving belt;
   the linear guiding mechanism comprising:
   a V-shaped track positioned inside the casing in the same direction as the travel path of the carrier chassis, wherein the upper section of the V-shaped track includes a pair of support surfaces, the support surfaces extend in a direction parallel to the longitudinal direction of the V-shaped track, and the support surfaces form an included angle; and a positioning bump attached to the carrier chassis, wherein a pair of protruding edges on the positioning bump are supported by the support surfaces on the V-shaped track.

10. The linear guiding mechanism of claim 9, wherein the positioning bump and the carrier chassis are formed together as an integrative unit.

11. The linear guiding mechanism of claim 9, wherein the V-shaped track is attached to the interior sidewall of the casing to form an integrated unit.

12. The linear guiding mechanism of claim 9, wherein the V-shaped track is fabricated using two monorails with each monorail having a support surface at its upper section.

13. The linear guiding mechanism of claim 12, wherein at least a portion of the driving belt is enclosed within the space between the two monorails.

14. The linear guiding mechanism of claim 12, wherein the clamping structure protrudes into the space between the monorails.

15. The linear guiding mechanism of claim 12, wherein the monorails are attached to the interior sidewall of the casing to form an integrative unit.

16. The linear guiding mechanism of claim 9, wherein the optical scanner further includes a positioning structure attached to the interior sidewall of the casing to serve as a retainer for the carrier chassis.

17. The linear guiding mechanism of claim 16, wherein the positioning structure is attached to the interior sidewall of the casing to form an integrative unit.

* * * * *